United States Patent
Götz et al.

(10) Patent No.: US 12,372,949 B2
(45) Date of Patent: Jul. 29, 2025

(54) METHOD AND ARRANGEMENT FOR COMMISSIONING AN UPDATED APPLICATION FOR AN INDUSTRIAL AUTOMATION ARRANGEMENT

(71) Applicant: Siemens Aktiengesellschaft, Munich (DE)

(72) Inventors: Jan Götz, Buckenhof (DE); Jürgen Reichmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 482 days.

(21) Appl. No.: 17/954,500

(22) Filed: Sep. 28, 2022

(65) Prior Publication Data
US 2023/0101026 A1    Mar. 30, 2023

(30) Foreign Application Priority Data
Sep. 29, 2021 (EP) .................................. 21199868

(51) Int. Cl.
G05B 19/418    (2006.01)
G06F 8/65    (2018.01)
G06F 8/71    (2018.01)

(52) U.S. Cl.
CPC .......... *G05B 19/4185* (2013.01); *G06F 8/65* (2013.01); *G06F 8/71* (2013.01)

(58) Field of Classification Search
CPC ............. G05B 19/4185; G05B 19/042; G05B 19/048; G05B 19/4155; G05B 23/02;
(Continued)

(56) References Cited

U.S. PATENT DOCUMENTS
10,037,203 B1    7/2018  Chavez et al.
2010/0088471 A1    4/2010  Sunaga et al.
(Continued)

FOREIGN PATENT DOCUMENTS
EP    2790101 B  *   1/2016
JP    2002-024042       1/2002
(Continued)

OTHER PUBLICATIONS

Paul Turner, The Correct Way to Commission Automation Systems, Aug. 25, 2020, p. 1-45 (Year: 2020).*
(Continued)

*Primary Examiner* — Kidest Bahta
(74) *Attorney, Agent, or Firm* — Cozen O'Connor

(57) ABSTRACT

A method and arrangement for commissioning an updated application for an industrial automation arrangement, wherein a first, existing application on a first controller and the updated application on a test device are executed in parallel, where local software (in particular a proxy service (proxy)) writes sensor data to the process image of a separate test device, where memory cells (e.g., I/O values, variables or registers) not yet belonging to the local process image of the test device are applied or allocated there, such that the "external" data and values of the productive system (first controller) are available in the local process image of the test device, without needing to change the production version of the application or the version of the application to be tested, and where the output values of the updated application are tested; if successful, the updated application is cleared for operation.

12 Claims, 5 Drawing Sheets p: write mode ("provided")
c: read mode ("consumed")

(58) Field of Classification Search
CPC ..... G06F 8/65; G06F 8/71; G06F 8/70; G06F 11/3692; G06F 11/3688; G06F 11/3696; G06F 11/3698
See application file for complete search history.

(56) References Cited

U.S. PATENT DOCUMENTS

| | | | |
|---|---|---|---|
| 2012/0226368 A1* | 9/2012 | Thomson | G05B 19/0426 700/87 |
| 2014/0059529 A1* | 2/2014 | Banavalikar | G06F 9/4406 717/170 |
| 2015/0192918 A1 | 7/2015 | Obermeier et al. | |
| 2016/0306335 A1* | 10/2016 | McKelvey | G05B 19/05 |
| 2017/0176982 A1* | 6/2017 | Lutz | G05B 19/4185 |
| 2019/0297160 A1 | 9/2019 | Harriman et al. | |
| 2020/0125485 A1* | 4/2020 | Wiener | G06F 11/3698 |
| 2020/0366513 A1 | 11/2020 | Yoneda et al. | |

FOREIGN PATENT DOCUMENTS

| | | |
|---|---|---|
| JP | 2010-113700 | 5/2010 |
| JP | 2019-080164 | 5/2019 |

OTHER PUBLICATIONS

EP Search Report dated Mar. 15, 2022 based on EP21199868 filed Sep. 29, 2021.

* cited by examiner

METHOD AND ARRANGEMENT FOR COMMISSIONING AN UPDATED APPLICATION FOR AN INDUSTRIAL AUTOMATION ARRANGEMENT

BACKGROUND OF THE INVENTION

1. Field of the Invention

The invention relates to industrial automation systems and, more particularly, to an arrangement and method for commissioning an updated application for an industrial automation arrangement.

2. Description of the Related Art

Modern control units have a local process image that they access in write mode and read mode. Data or values present in this process image may be used by control functions. Data or values of the process image are particularly known as I/O values, i.e., sensor data and actuator data.

External data, i.e., data that are not read/written via the digital and analog inputs/outputs or via buses that are typical for control units, such as Profinet, can be introduced or output into the control unit from external applications only via interfaces or protocols, such as Open Platform Communications Unified Architecture (OPC-UA), but these are then not a direct part of the local process image. In particular, the process images of two different control units are not visible to one another and thus also not mutually accessible. External data must therefore be introduced manually from the applications into the local process image. It is also normally necessary to stop and then restart the applications involved for this purpose.

A data exchange between applications on different devices is possible, for example using an OPC-UA protocol, or in the case of programmable logic controllers (PLCs) from Siemens, the S7 protocol. This is performed manually by the programmer in the engineering phase, i.e., it does not occur automatically and it cannot be performed during ongoing operation.

If an application is intended to access data on a remote-control unit, then this application must "manually" access a corresponding data channel. A locally available OPC UA server cannot manage this automatically, because it does not have a client capability. In the event that a local OPC UA client is present, the data linking must be performed "manually" or a matching algorithm has to come into effect.

In all of the known solutions, applications must access the data of a locally available process image, on the one hand, and external data, on the other hand, in various ways, meaning that the applications always have to be designed and/or configured for external access, which is often possible only with difficulty, or not possible at all, in particular in the case of existing applications (Brownfield applications, Legacy applications) and their subsequent versions provided for updates. Productive operation and simulation are therefore usually separate in the field of automation engineering.

The outlined restrictions make it difficult to test updated versions of existing applications, in particular in scenarios in which the new versions, containing what are known as "live data", are intended to be run in parallel with the previous version of the application on a separate test system. However, such tests are important because they allow the behavior of an existing version and a new version—in particular what is known as a "release candidate" or "beta version", i.e., a finished version that is ultimately intended to be tested—to be compared directly.

The versions to be tested must use an interface that is changed in comparison to the production version to access sensor data or generally the process image of the productive system, meaning that the new version to be tested differs from the existing version of an application at least in terms of the interface or specifically the API that accesses the process image. In other words, the version to be tested differs from the later production version, which is generally undesirable in tests. Until now, simulation of the final "release candidate" has therefore usually been performed beforehand, independently of productive operation.

SUMMARY OF THE INVENTION

In view of the foregoing, it is therefore an object of the present invention to simplify the access of applications to process images, in particular external process images, such that a uniform interface may be used for both productively operated versions of applications and versions of applications to be tested, running in parallel therewith.

A core concept for achieving this object is that local software, in particular a "proxy service" (or proxy), writes the sensor data that are obtained in an industrial automation installation and that are present in what is known as the process image of an industrial controller to the process image of a separate test system or reads them therefrom. In this case, memory cells (for example, I/O values, variables or registers) that do not yet belong to the local process image of the test system are applied or allocated there, preferably by a local process data management system, or registered at least in the local process data management system following application. The "external" data and values of the productive system are thus available in the local process image of the test system, without needing to change the production version of the application or the version of the application to be tested. A further core concept of the invention relates to the transfer of the data generated by the application to be tested (usually what are known as actuator values) to the local process image of the productive system, such that the application to be tested is can successively take control of the industrial arrangement on a test basis before the application to be tested is then ultimately incorporated into the productive system.

The foregoing and other objects of the invention are achieved in accordance with the invention by a method as claimed for commissioning an updated application for an industrial automation arrangement, where a first industrial controller containing a first application comprises at least one local process image containing locally used process data, where the process data consist of a number of values, in particular values for sensors and/or actuators of the industrial automation arrangement, where provision is made for a local process data management system for managing identifiers and memory addresses of the values, and where the first application exchanges information about the identifiers and memory addresses of the values with the local process data management system and reads and/or writes values from and/or to the at least one local process image using the information. Provision is made here for a test unit containing the updated application, in particular containing a new version, to be tested, of the first application, containing at least one further process image and containing a further process data management system, where the updated application exchanges information about the identifiers and memory addresses of the values with the local process data management system of the test unit and reads and/or writes values from and/or to the at least one further process image. For this purpose, a respective proxy service is set up on the controller and on the test unit, where the proxy service performs respective communication with the respective local process data management system and reads and/or writes values from and/or to the respective local process image using the information exchanged in the process, where the updated application is executed in parallel with the first application, and where the values to be read from the updated application are read from the at least one process image of the first controller by the proxy services and inserted into the at least one further process image. Here, a monitoring device tests at least one output value stored in the at least one process image of the test unit by the updated application, where the updated application is cleared for use in productive operation only following a successful test. As a result of the method in accordance with the invention, an application to be tested is can already, in the same way as subsequently described for accessing locally available data in a process image of a productive system, access these data of the productive system on the test system, without needing to change or reconfigure the application for this purpose.

It is also an object of the invention to provide an arrangement that is configured to implement the method in accordance with the invention. For this purpose, provision is made for an arrangement for commissioning an updated application for an industrial automation arrangement, where a first industrial controller containing a first application comprises at least one local process image containing locally used process data, where the process data consist of a number of values, in particular values for sensors and/or actuators of the industrial automation arrangement, where the first controller comprises a local process data management system for managing identifiers and memory addresses of the values, and where the first application is configured to exchange information about the identifiers and memory addresses of the values with the local process data management system and is configured to read and/or write values from and/or to the at least one local process image using the information. In addition, a test unit contains the updated application, in particular contains a new version, to be tested, of the first application, and contains at least one further process image and contains a further process data management system, where the updated application is configured to exchange information about the identifiers and memory addresses of the values with the local process data management system of the test unit and to read and/or write values from and/or to the at least one further process image, where a respective proxy service is set up on the controller and on the test unit, where the proxy service is configured to perform respective communication with the respective local process data management system and to read and/or write values from and/or to the respective local process image using the information exchanged in the process, where the updated application is executed in parallel with the first application, where furthermore the values to be read from the updated application are read from the at least one process image of the first controller by the proxy services and inserted into the at least one further process image, where a monitoring device tests at least one output value stored in the at least one process image of the test unit by the updated application, and where furthermore the updated application is cleared for use in productive operation only following a successful test. This arrangement makes it possible to achieve the above-described advantages with reference to the method in accordance with the invention.

In a first embodiment, the output values generated by the updated application may be plausibility-tested, in particular with regard to compliance with fixedly predefined criteria or limit values. In one particularly advantageous embodiment, at least one value written to the process image of the first controller as output value by the first application is read from the at least one process image of the first controller by the proxy services and transferred to the monitoring device, after which the monitoring device, for the test, performs a comparison between the output value of the first application and the corresponding output value of the updated application. Advantageously, for this purpose, the value read from the process image of the first controller is inserted into the at least one further process image, after which the monitoring device, for the comparison, accesses this stored value in the further process image. In one example, in the event that a difference is identified in the comparison, this difference being below a predefined threshold value in terms of percentage or in absolute terms and optionally after a predefined time, the updated application is provided as a candidate for incorporation into productive operation, transferred to the first productive controller and put into operation there instead of the original version of the application. For this purpose, the monitoring device, in the event of clearance for productive operation, initiates installation and booting of the updated application on the first controller and prompts a changeover from at least one output value of the first application to the corresponding output value of the newly installed and commissioned updated application for operation of the industrial automation arrangement. Instead of or in addition to monitoring the difference for a percentage or absolute deviation, more complex algorithms or policies may also be used.

The access of the updated application to the values, in particular sensor data, of the first application or of the productive system may be configured automatically because, in the event that the updated application requests the address information of a locally unavailable value from the local process data management system of the test unit, in a first step, the process data management system forwards the request to the local proxy service. In a second step, the local proxy service forwards the request to the proxy service of the first controller, in a third step, this proxy service reads the value from a local process image of the first controller and forwards it to the proxy service of the requesting test unit. In a fourth step, the proxy service of the requesting test unit inserts the value into the at least one local process image and registers the associated address information in the local process data management system In a fifth step, the local process data management system responds to the request of the updated application with the address information, and, in a sixth step, the updated application accesses the value via the address information.

The programming interface or the interface, by way of which an application accesses a process image, is advantageously standardized, where these interfaces of the applications and the proxy devices should not be functionally different. It is therefore advantageous to encapsulate this interface in a separate application for the proxy device, such that different versions of the proxy device that are intended to be provided for different platforms can use the identical interface of the applications that are generated for the same platforms. To this end, the proxy services each instantiate a local proxy application, where the proxy applications access the respective local process image. In the same way, it is advantageous for each application to communicate with the respective local process data management system of the controller via a uniform application interface, and for the proxy service to communicate with the process data management system of the same controller via a functionally identical or identical application interface.

Advantageously, the proxy services transfer requests and values via an Internet protocol. In particular, the proxy services advantageously communicate with one another via an OPC UA protocol, such that the data exchange between the first controller and the test system can be configured automatically.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the method in accordance with the invention are explained below with reference to the drawings. These at the same time serve to explain an arrangement in accordance with the invention, in which.

DETAILED DESCRIPTION OF THE EXEMPLARY EMBODIMENTS

Figure 1:
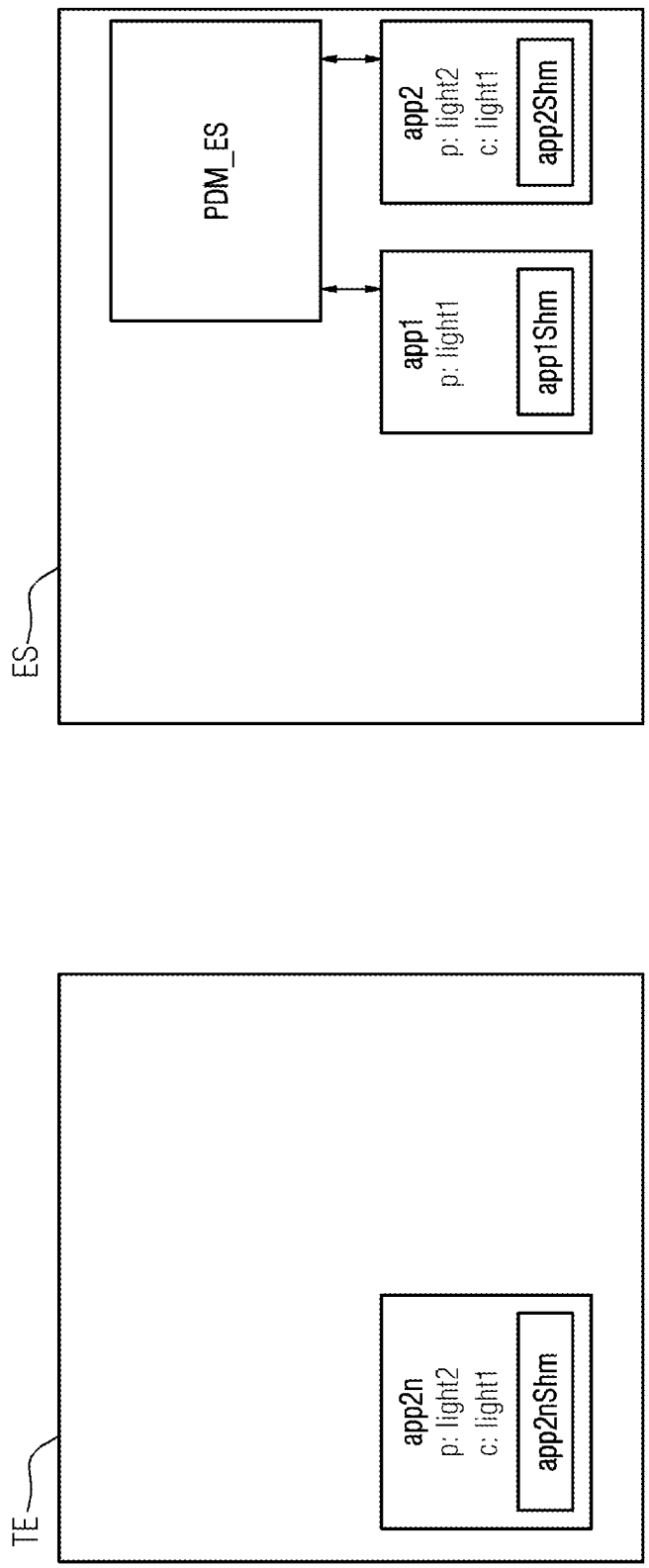
FIG. 1 shows a starting state for explaining the problem.

FIG. 1 shows the starting state for the following explanations. The right-hand side of the figure shows a first industrial controller ES, which is also referred to below as a productive system or productive unit. The productive unit ES comprises the process data management system PDM_ES, which coordinates and manages the applications app1, app2 running on the productive unit ES (in particular their data flows and process images). The process data management system PDM_ES does not intervene in the actual data flow. To this end, the applications app1, app2 access the process images app1Shm, app2Shm directly. Access is made here to what are known as shared memories ("Shm"), i.e., applications that produce data and write this data to a shared memory assigned to the respective application, where the shared memory constitutes the process image. It is possible to read from and write to the shared memory in each case across the system on the respective platform. Applications that wish to use (consume) these data receive the information via the process data management system, where these data are contained in the shared memory. The application app2 reads the value light1 written to the process image (shared memory) app1Shm by app1; this value is required by the application app2 to calculate an output variable light2. The process data management system has conveyed the knowledge about where to find light1. The double-headed arrows each symbolize the information exchange between the applications and the process data management system required for this purpose. Conversely, the application app2 provides the datum light2 (the "writing" is identified by the prefix "p:"—"provided"); in the present simple example, this datum light2 is control information for a connected industrial process. By way of example, a connected light may adopt a brightness of between 0% and 100% depending on how high the value of this "variable" light2 is.

The app2n ("app2 new") is located outside the productive unit ES, executes on a separate test system TE and is intended to replace the app2 used in the productive unit following a successful test. For the test, which is intended to occur as far as possible in temporal parallel operation of the applications app2, app2n, the updated application app2n requires access to the datum light1 of the first controller ES (specifically the application app1). Read access is represented by the identifier "c:" ("consumed").

Figure 2:
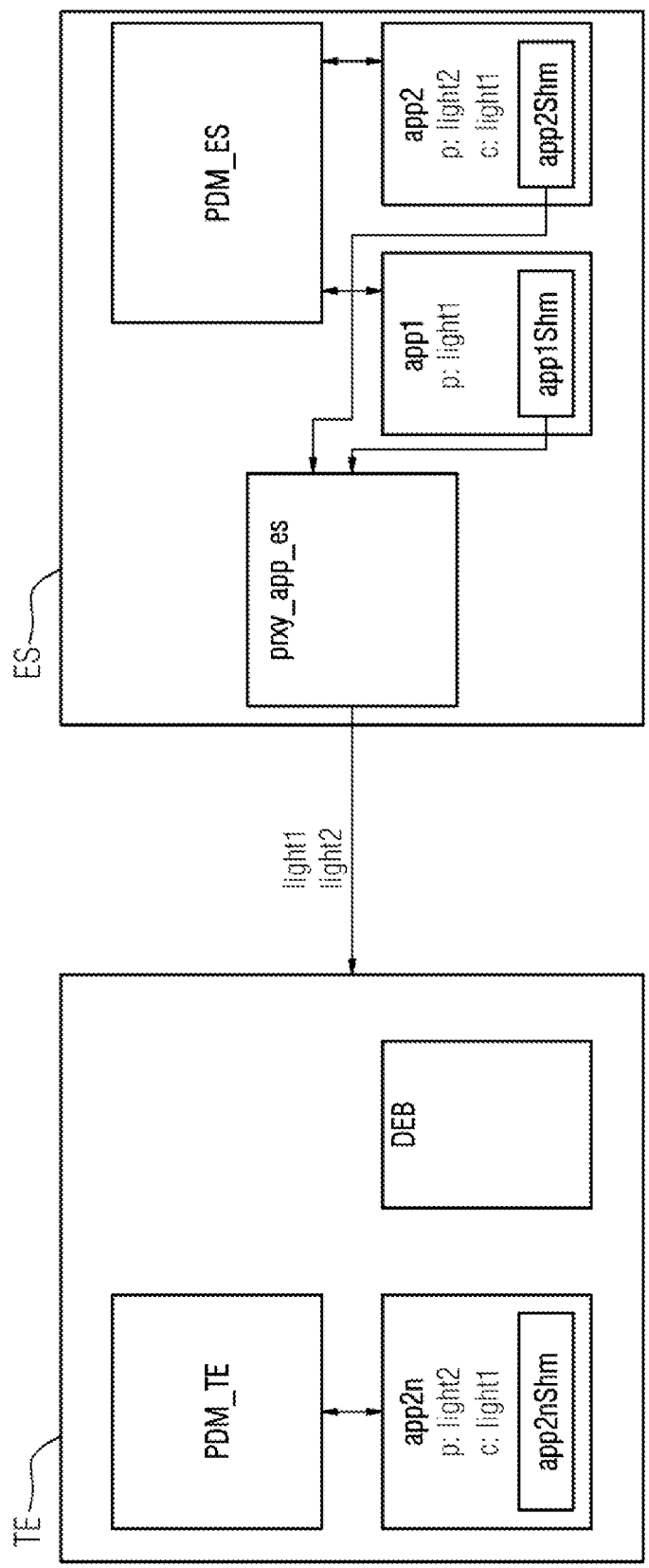
FIG. 2 shows values being made available from the process data management system of a productive unit to a test unit in accordance with the invention.

FIG. 2 illustrates how the app2n is booted on the test unit TE by a user. The application app2n registers directly in the local process data management system PDM_TE of the test unit TE, which in turn triggers the process data management system PDM_ES of the productive unit ES. This is subsequently explained in more detail with reference to FIG. 3.

The process data management system PDM_ES of the productive unit ES, for this purpose, initiates what is known as a proxy service prxy_app_es (also called proxy unit) on the productive unit ES. The proxy service prxy_app_es is, in this case, booted such that it reads the data light1 and light2 produced in the productive unit ES and makes them "externally" available via an IP communication interface (arrow between the units TE and ES). For this purpose, the process data management system PDM_TE of the test unit TE transfers information about the "desired data" light1 and light2 to the process data management system PDM_ES of the productive unit ES; this communication passes through the proxy devices prxy_app_te, prxy_app_es (see FIG. 3); a server or "distributor" (not illustrated) may additionally also be incorporated into the communication, between the units. A monitoring device DEB, i.e., a debugging and engineering system, or "debugger" ("DEB"), is furthermore installed on the test unit TE and controls and evaluates the test. The debugging and engineering system is often also called an integrated development environment ("IDE").

Figure 3:
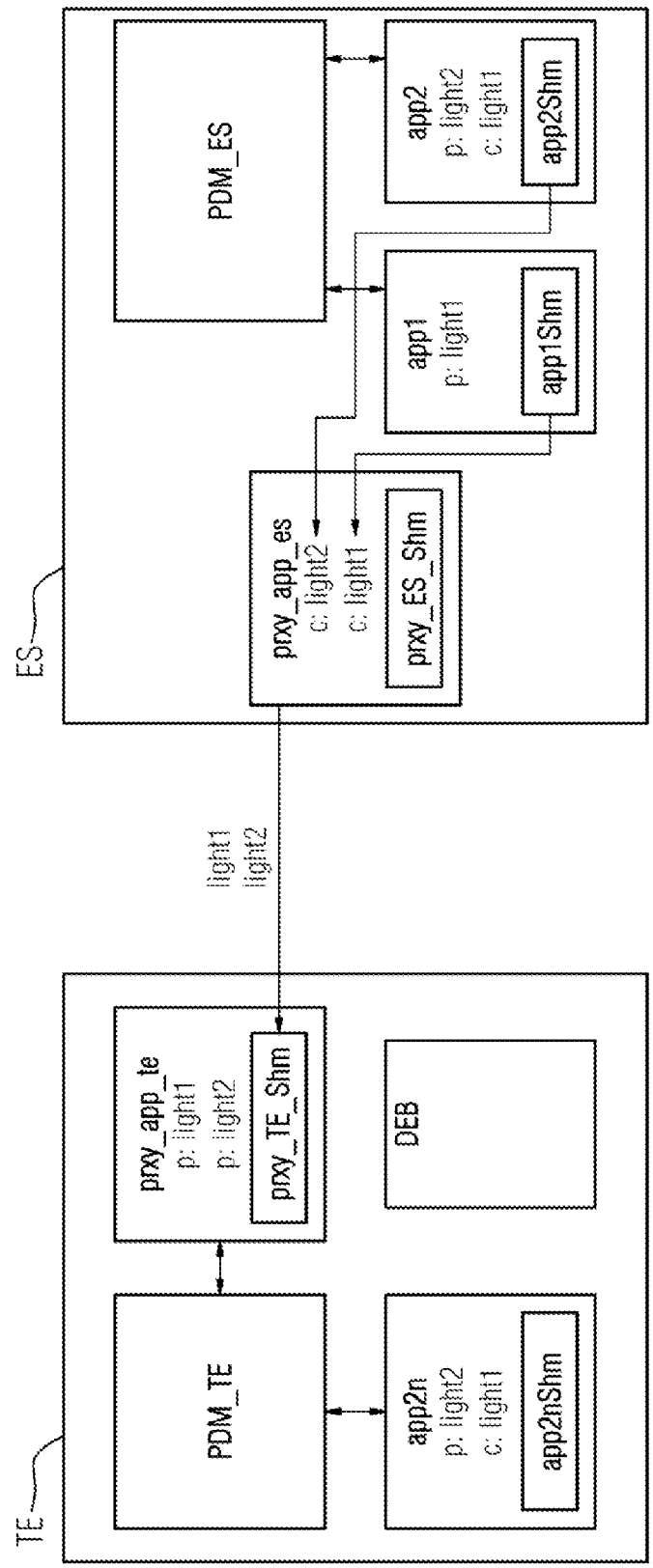
FIG. 3 shows the values of FIG. 2 being made available for applications of the test unit.

FIG. 3 shows how the process data management system PDM_TE of the test unit TE, for its part, boots the proxy service prxy_app_te (local proxy application of the test unit). The proxy service prxy_app_te uses the IP communication interface to read the data light1 and light2 made available by the proxy service prxy_app_es and writes them to its local process image prxy_TE_Shm (shared memory of the proxy service). As an alternative or in addition, the datum light1 may also be written or copied to the process image app2nShm of the application app2n. The data light1 and light2 are registered by registering the "variable names" and the memory addresses in the process data management system PDM_TE and are thus available to the application app2n and the debugger or the monitoring device DEB. The datum light2 is however consumed or read from this memory prxy_TE_Shm only by the monitoring device or the debugger DEB, which is intended to compare this version of the datum light2 later with the version from the memory app2nShm of the application app2n.

The data light1 and light2 and their storage location in the process image prxy_TE_Shm are thus registered in the process data management system PDM_TE of the test unit TE, such that this forwards the information of the datum light1, which is now present locally on the test unit TE, to the consuming application app2n.

Figure 4:
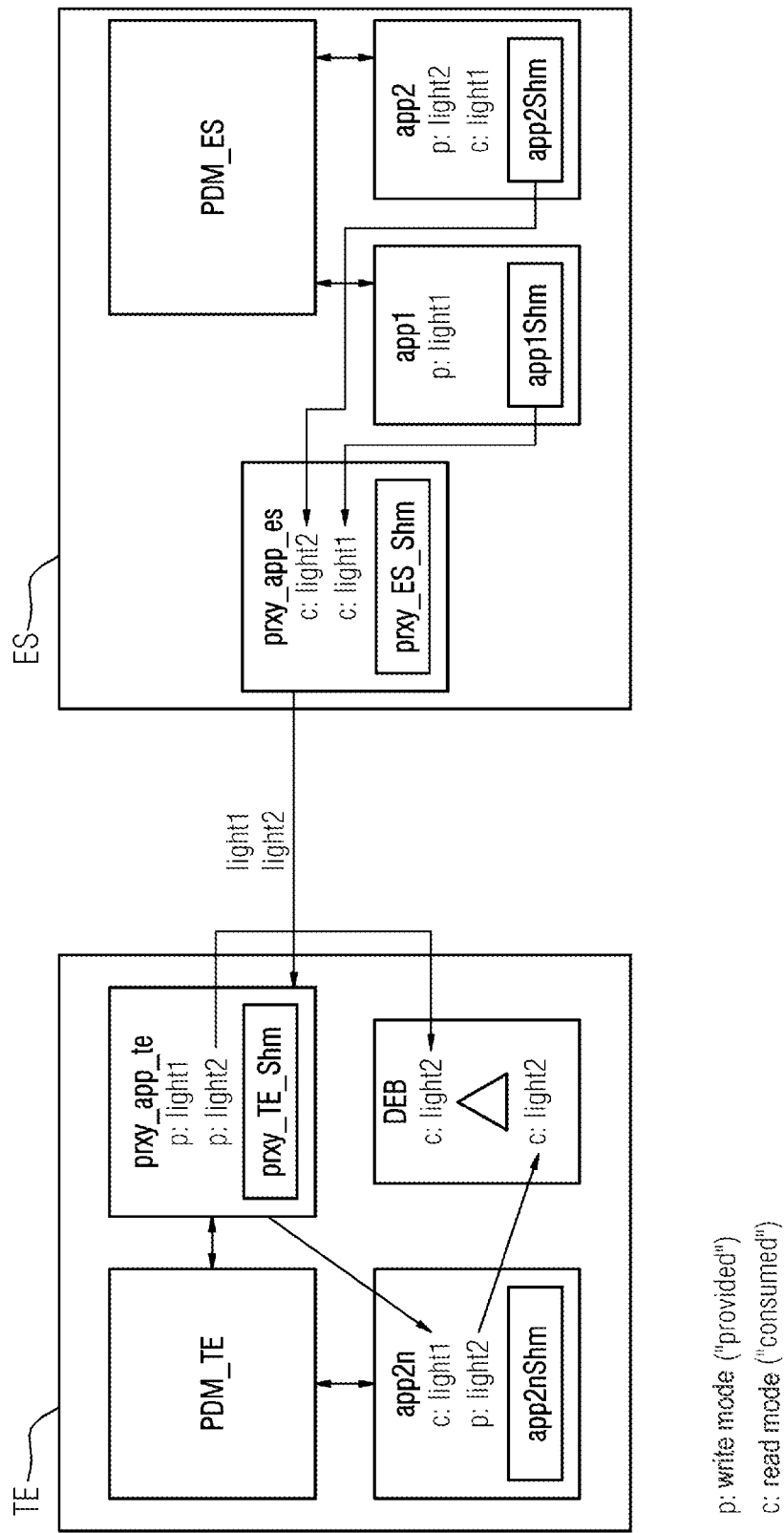
FIG. 4 shows the testing of an updated application of the test unit in parallel with an application of the productive unit in accordance with the invention.

FIG. 4 illustrates how the application app2n then reads the datum light1 from the process image prxy_TE_Shm of the proxy device prxy_app_te, i.e., the application app2n uses the interposed proxy applications prxy_app_es and prxy_app_te to receive the datum light1 from the application app1 from the productive unit ES and may thus be tested with the "original data", i.e., there is in particular the possibility of comparing the datum light2 produced by each of the applications app2 and app2n (represented by a triangle). Instead of a comparison, the datum light2 produced by the application app2n may also be tested against other parameters, such as fixed limit values. It is also possible for the datum light2 produced by the updated application app2n to be sent back to the productive unit ES via the proxy services or proxy applications prxy_app_es and prxy_app_te and to be written to the process image app2Shm there, such that, in a further step, the application app2n still located on the test unit assumes the tasks of the original application app2 (this process is not illustrated in the figures for the sake of clarity). In the case of a large number of generated output values, this may occurs in steps, where a user of the debugger DEB may separately set, for each output value, whether and when and under what conditions the "original" or the value produced by the updated application is used in productive operation.

In this process, the user, via a user interface, thus has full control over which data generated by the application app2n (for example, values for actuators) should be incorporated into productive operation, where this is possible due to the data structure using the proxy services prxy_app_es and prxy_app_te. All of the processes may be monitored by the user at all times using a test or debugging device DEB; it is also possible in particular to prevent values that are unsuitable for safety reasons or the like being put into production.

In a final step (not illustrated), following a successful test, the updated application app2n is transferred to the productive unit ES and there is then a seamless changeover at this location from the application app2 to the new application app2n. The original application app2 may now be stopped and removed from the productive unit ES, since the application app2n has assumed all of the tasks.

This allows a gradual incorporation of applications from simulation/test into ongoing operation. While testing an application, the user already has the possibility to incorporate data into the productive system and thus to successively commission an updated application on a test basis, with it being possible to switch back to the control values created by the original application at any time.

Figure 5:
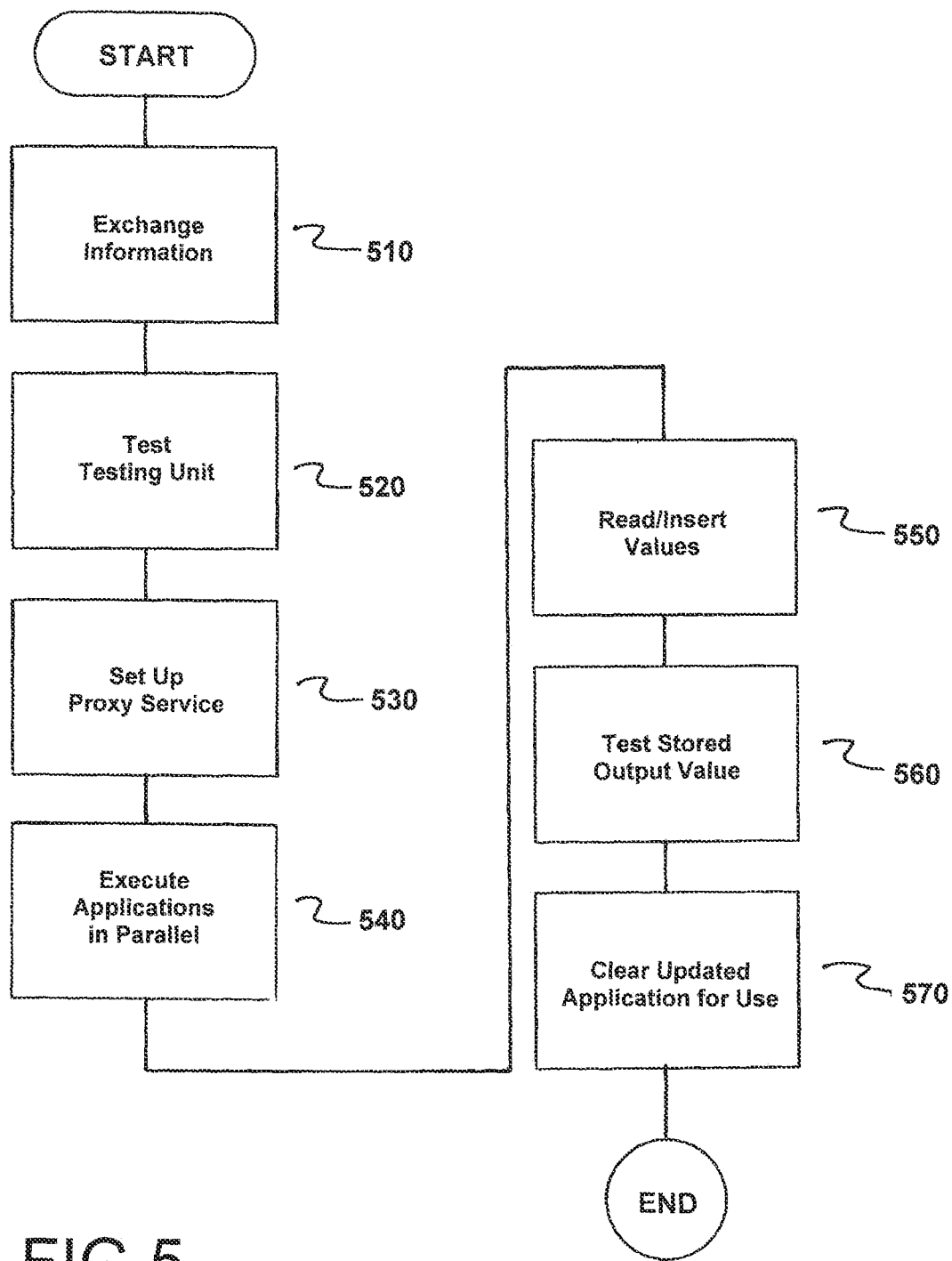
FIG. 5 is a flowchart of the method in accordance with the invention.

FIG. 5 is a flowchart of the method for commissioning an updated application app2n for an industrial automation arrangement, where a first industrial controller ES contains a first application app2 comprising at least one local process image app1Shm, app2Shm containing locally used process data, the process data includes a plurality of numbers comprising values for sensors and/or actuators of the industrial automation arrangement, and a local process data management system (PDM_ES) manages identifiers and memory addresses of the values.

The method comprises exchanging, by the first application app2, information about identifiers and memory addresses of the values with the local process data management system PDM_ES and reading and/or writing values from and/or to the at least one local process image app1Shm, app2Shm utilizing the information, as indicated in step 510.

Next, a test unit TE containing the updated application app2n comprising a new version of the first application app2 to be tested, containing at least one further process image app2nShm and containing a further process data management system PDM_TE is tested, as indicated in step 520. In accordance with the method of the invention, the updated application app2 exchanging information about the identifiers and memory addresses of the values with the local process data management system PDM_TE) of the test unit TE and reading and/or writing values from and/or to the at least one further process image app2nShm.

Next, a respective proxy service is step up on the first controller ES and on the test unit, as indicated in step 530. Here, the respective proxy service performs respective communication with the respective local process data management system PDM_ES, PDM_TE and reads and/or writes values from and/or to the respective local process image app1Shm, app2Shm, app2nShm utilizing the information exchanged in the process.

Next, the updated application app2n is executed in parallel with the first application app2, as indicated in step 540. Next, the values to be read are read from the updated application app2n from the at least one process image app1Shm, app2Shm of the first controller by the proxy services and inserted into the at least one further process image app2nShm, as indicated in step 550.

Next, a monitoring device DEB tests at least one output value stored in the at least one process image app2nShm of the test unit TE by the updated application app2n, as indicated in step 560. The updated application app2n is then cleared for use in productive operation only following a successful test, as indicated in step 570.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for commissioning an updated application for an industrial automation arrangement, a first industrial controller containing a first application comprising at least one local process image containing locally used process data, the process data including a plurality of numbers comprising values for at least one of (i) sensors and (ii) actuators of the industrial automation arrangement, and a local process data management system managing identifiers and memory addresses of the values, the method comprising:

exchanging, by the first application, information about identifiers and memory addresses of the values with the local process data management system and reading and/or writing values from and/or to the at least one local process image utilizing the information;

testing a test unit containing the updated application comprising a new version of the first application to be tested, containing at least one further process image and containing a further process data management system, the updated application exchanging information about the identifiers and memory addresses of the values with the local process data management system of the test unit and reading and/or writing values from and/or to the at least one further process image;

setting up a respective proxy service on the first controller and on the test unit, the respective proxy service performing respective communication with the respective local process data management system and reading and/or writing values from and/or to the respective local process image utilizing the information exchanged in the process;

executing the updated application in parallel with the first application;

reading the values to be read from the updated application from the at least one process image of the first controller by the proxy services and inserting said read values into the at least one further process image;

testing, by a monitoring device, at least one output value stored in the at least one process image of the test unit by the updated application; and clearing the updated application for use in productive operation only following a successful test.

2. The method as claimed in patent claim 1, wherein at least one value written to the process image of the first controller as output value by the first application is read from the at least one process image of the first controller by the proxy services and transferred to the monitoring device; and
wherein the monitoring device, for the test, performs a comparison between the output value of the first application and the output value of the updated application.

3. The method as claimed in patent claim 2, wherein the value read from the process image of the first controller is inserted into the at least one further process image and the monitoring device, for the comparison, accesses this stored value in the further process image.

4. The method as claimed in patent claim 2, wherein, in an event a difference is identified in the comparison, this difference being below a predefined threshold value in terms of percentage or in absolute terms, the updated application is provided as a candidate for incorporation into productive operation.

5. The method as claimed in patent claim 3, wherein, in an event a difference is identified in the comparison, this difference being below a predefined threshold value in terms of percentage or in absolute terms, the updated application is provided as a candidate for incorporation into productive operation.

6. The method as claimed in patent claim 1, wherein the monitoring device, in an event of clearance for productive operation, initiates installation and booting of the updated application on the first controller and prompts a changeover from at least one output value of the first application to the corresponding output value of the newly installed and commissioned updated application for operation of the industrial automation arrangement.

7. The method as claimed in patent claim 1, wherein in an event the updated application requests address information of a locally unavailable value from the local process data management system of the test unit;

in a first step, the process data management system forwards the request to the local proxy service;

in a second step, the local proxy service forwards the request to the proxy service of the first controller;

in a third step, this proxy service reads the value from a local process image of the first controller and forwards said read value to the proxy service of a requesting test unit;

in a fourth step, the proxy service of the requesting test unit inserts the forwarded read value into the at least one local process image and registers associated address information in a local process data management system;

in a fifth step, the local process data management system responds to a request of the updated application with the address information; and in a sixth step, the updated application accesses the value via the address information.

8. The method as claimed in patent claim 1, wherein at least one proxy service of the proxy services instantiates a local proxy application which accesses the local process image for the proxy service.

9. The method as claimed in patent claim 1, wherein each application communicates with the respective local process data management system of the controller or test unit via a uniform application interface; and
wherein the proxy service communicates with the process data management system of the same controller or test unit via a functionally identical or identical application interface.

10. The method as claimed in patent claim 1, wherein the proxy services transfer requests and values via an Internet protocol.

11. The method as claimed in patent claim 10, wherein the proxy services communicate with one another via an Open Platform Communications Unified Architecture (OPC-UA) protocol.

12. An arrangement for commissioning an updated application for an industrial automation arrangement, the arrangement comprising:

a first industrial controller containing a first application comprising at least one local process image containing locally utilizing process data, the process data including a plurality of values comprising values for at least one of (i) sensors and (ii) actuators of the industrial automation arrangement, the first controller (ES) comprising a local process data management system (PDM_ES) for managing identifiers and memory addresses of the values, and the first application (app2) being configured to exchange information about the identifiers and memory addresses of the values with the local process data management system (PDM_ES) and being configured to read and/or write values from and/or to the at least one local process image (app1Shm, app2Shm) utilizing the information;

a test unit (TE) containing the updated application (app2n) comprising a new version of the first application (app2) to be tested, containing at least one further process image (app2nShm) and containing a further process data management system (PDM_TE), the updated application (app2n) being configured to exchange information about the identifiers and memory addresses of the values with the local process data management system (PDM_TE) of the test unit and to read and/or write values from and/or to the at least one further process image (app2nShm), wherein a respective proxy service is set up on the controller and on the test unit, the respective proxy service being configured to perform respective communication with the respective local process data management system and to read and/or write values from and/or to the respective local process utilizing the information exchanged in the process;

wherein the updated application is executed in parallel with the first application, the values to be read from the updated application are read from the at least one process image of the first controller by the proxy services and inserted into the at least one further process image; and wherein the arrangement further comprises a monitoring device for testing at least one output value stored in the at least one process image of the test unit by the updated application, the updated application being cleared for use in production operation only following a successful test.

* * * * *